US012576676B2

(12) United States Patent
    Epler

(10) Patent No.:    US 12,576,676 B2
(45) Date of Patent:     Mar. 17, 2026

(54) AUTOMATIC TIRE INFLATION SYSTEM HOSE WITH INTEGRATED TPMS SENSOR

(71) Applicant: Phillips Connect Technologies LLC, Santa Fe Springs, CA (US)

(72) Inventor: Jim Epler, Irvine, CA (US)

(73) Assignee: Phillips Connect Technologies LLC, Santa Fe Springs, CA (US)

( * ) Notice: Subject to any disclaimer, the term of this patent is extended or adjusted under 35 U.S.C. 154(b) by 0 days.

(21) Appl. No.: 18/600,558

(22) Filed: Mar. 8, 2024

(65) Prior Publication Data

US 2024/0208276 A1     Jun. 27, 2024

Related U.S. Application Data

(63) Continuation of application No. PCT/US2022/043249, filed on Sep. 12, 2022.

(60) Provisional application No. 63/243,068, filed on Sep. 10, 2021.

(51) Int. Cl.
    *B60C 23/00*      (2006.01)
    *B60C 23/04*      (2006.01)
    *B60C 29/06*      (2006.01)
    *B60S 5/04*      (2006.01)
    *G01L 17/00*      (2006.01)

(52) U.S. Cl.
    CPC .. *B60C 23/00354* (2020.05); *B60C 23/00309* (2020.05); *B60C 23/0496* (2013.01); *B60C 29/064* (2013.01); *B60S 5/043* (2013.01); *G01L 17/00* (2013.01); *Y10T 137/3662* (2015.04); *Y10T 137/3724* (2015.04)

(58) Field of Classification Search
CPC . B60C 23/0496; B60S 5/043; Y10T 137/3662
See application file for complete search history.

(56) References Cited

U.S. PATENT DOCUMENTS

| | | | | |
|---|---|---|---|---|
| 938,522 | A | * | 11/1909 | Swain ................... F04B 43/009 |
| | | | | 137/227 |
| 1,102,730 | A | * | 7/1914 | Desmond ............ B60C 23/0496 |
| | | | | 137/227 |
| 1,699,378 | A | * | 1/1929 | Smith ..................... B60S 5/043 |
| | | | | 137/227 |
| 1,865,871 | A | * | 7/1932 | D Orsay ................. G01L 17/00 |
| | | | | 137/227 |
| 4,143,545 | A | * | 3/1979 | Sitabkhan ............... B60C 23/02 |
| | | | | 137/227 |
| 4,658,869 | A | * | 4/1987 | Soon-Fu ................. B60S 5/043 |
| | | | | 137/227 |
| 4,969,493 | A | * | 11/1990 | Lee ......................... B60S 5/043 |
| | | | | 73/146 |
| 5,158,122 | A | * | 10/1992 | Moffett ................... B60S 5/043 |
| | | | | 137/227 |
| 5,197,435 | A | * | 3/1993 | Mazur ................... F02M 61/145 |
| | | | | 123/456 |
| 5,235,859 | A | * | 8/1993 | Wallis ................. G01L 19/0007 |
| | | | | 137/227 |

(Continued)

FOREIGN PATENT DOCUMENTS

CN       206493797     *   9/2017

*Primary Examiner* — Robert K Arundale
(74) *Attorney, Agent, or Firm* — Haynes and Boone, LLP

(57)          ABSTRACT

A TPMS-sensor-integrated automatic tire inflation system hose is provided that includes an inspection valve and a TPMS sensor.

6 Claims, 4 Drawing Sheets

(56)  References Cited

U.S. PATENT DOCUMENTS

| | | | | |
|---|---|---|---|---|
| 5,855,222 | A * | 1/1999 | Jou | B05B 1/005 |
| | | | | 137/580 |
| 8,564,429 | B2 | 10/2013 | Zhou | |
| 2007/0295075 | A1* | 12/2007 | Kiefer | B60S 5/043 |
| | | | | 73/146.8 |
| 2008/0149244 | A1* | 6/2008 | Liao | B60C 23/0408 |
| | | | | 152/427 |
| 2009/0025797 | A1* | 1/2009 | Ratner | F16K 24/04 |
| | | | | 137/228 |
| 2010/0180678 | A1* | 7/2010 | Casner | B60C 23/007 |
| | | | | 73/146.8 |
| 2012/0227662 | A1* | 9/2012 | Coombs | G01L 19/10 |
| | | | | 116/271 |
| 2020/0148391 | A1* | 5/2020 | Sallman | B64C 25/36 |
| 2022/0234402 | A1* | 7/2022 | Zhang | B60C 29/002 |

* cited by examiner

THREADS
1/8" FEMALE NPT
3 PLACES

115

9/16"-20
FEMALE THREAD

SHRADER VALVE
1/8"

Inspection Valve

140

125

TPMS
Sensor

120

AUTOMATIC TIRE INFLATION SYSTEM HOSE WITH INTEGRATED TPMS SENSOR

CROSS-REFERENCE TO RELATED APPLICATIONS

This application is a continuation of International Patent Application No. PCT/US2022/043249 filed Sep. 12, 2022 and entitled "AUTOMATIC TIRE INFLATION SYSTEM HOSE WITH INTEGRATED TPMS SENSOR," which claims the benefit of U.S Provisional Patent Application No. 63/243,068, filed Sep. 10, 2021 and entitled "AUTOMATIC TIRE INFLATION SYSTEM HOSE WITH INTEGRATED TPMS SENSOR" the contents of which both are incorporated by reference in their entirety.

TECHNICAL FIELD

The present invention relates to automatic tire inflation systems, and more particularly to an automatic tire inflation system hose with an integrated TPMS sensor.

BACKGROUND

A towable asset such as a trailer used in commercial trucking applications include a relatively large number of tires that are all subject to leakage. Since there are so many tires, it is cumbersome for a user to manually check the tire pressures and restore the tire pressures as needed. To increase safety and reduce the maintenance burden, various automatic tire inflation systems have been developed. For example, a towable asset may include a pressurized tank that connects through a regulator to conduits connecting to rotary housings in the tire hubs. As implied by the name, each rotary housing may rotate with its associated tire. An automatic tire inflation system hose connects from the rotary housing to the corresponding tire inflation valve such as a Shrader valve. Pressurized and regulated gas is thus provided to each tire. Should the tire leak, the automatic tire inflation system hose supplies additional gas to keep the tire at the desired regulated pressure. Various safeguards have been developed to prevent over inflation from the automatic tire inflation system so that the tires are prevented from being under-inflated or over-inflated.

Since each tire's valve is connected to a corresponding automatic tire inflation system hose, a user cannot manually check the tire pressure by applying a tire pressure gauge to the tire's valve. It is thus conventional for an automatic tire inflation system hose to include an inspection valve such as an additional Schrader valve so that a user may manually check the tire pressure if desired.

To provide additional safety for the automatic tire inflation system, it is conventional to also monitor each tire pressure through a tire pressure monitor system (TPMS) sensor. Each TPMS sensor is configured to sense tire pressure and wirelessly transmit the sensed tire pressure to a receiver. TPMS sensors may also monitor other parameters such as tire temperature and wirelessly transmit these additional parameters to the receiver. A user cannot mount the TPMS sensor to the tire valve since the tire valve is coupled to the automatic tire inflation system hose. It is thus conventional for a user to attach the TPMS sensor to the inspection valve on the automatic tire inflation system hose.

There are several issues with such mounting of the TPMS sensor to the inspection valve. For example, trailers are often left at loading docks for an extended period of time. Theft of the TPMS sensor may thus be an issue. In addition, the ability to manually check the tire pressure through the inspection valve may be required at truck inspections or by the user. But with the TPMS sensor mounted to the inspection valve, a user must then remove the TPMS sensor to have access for the tire pressure gauge. The TPMS sensor is thus often lost or misplaced as a result.

SUMMARY

A TPMS-sensor-integrated automatic tire inflation system hose is provided that includes: a first valve for threading to a tire valve at a first end of the TPMS-sensor-integrated automatic tire inflation system hose; a second valve for threading to a rotary housing valve at a second end of the TPMS-sensor-integrated automatic tire inflation system hose; a resin hose coupled between the first end and the second end; an inspection valve in fluid communication with a lumen of the resin hose; and a TPMS sensor in fluid communication with the lumen of the resin hose.

These and additional advantageous features of the disclosed embodiments may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

A TPMS-sensor-integrated automatic tire inflation system hose is provided that includes an inspection valve to allow a user to manually inspect the tire pressure. The integration of the TPMS sensor with the hose provides the TPMS sensor with a defined orientation when the hose is mounted between the rotary housing and the tire valve. In this fashion, a user may be assured that the TPMS sensor is directed for optimum fidelity of wireless transmission of the tire pressure and any other monitored parameters to a receiver. In contrast, if a user mounts the TPMS sensor to the inspection valve in a conventional fashion, the orientation of the TPMS sensor will tend to be random as the TPMS sensor is screwed down to the inspection valve threads. The defined position provided by integrating the TPMS sensor with the hose may vary depending upon the wireless transmission capabilities of the TPMS sensor. In some implementations, Applicant has found that the TPMS sensor should face away from the trailer in the axle direction.

Figure 1A:
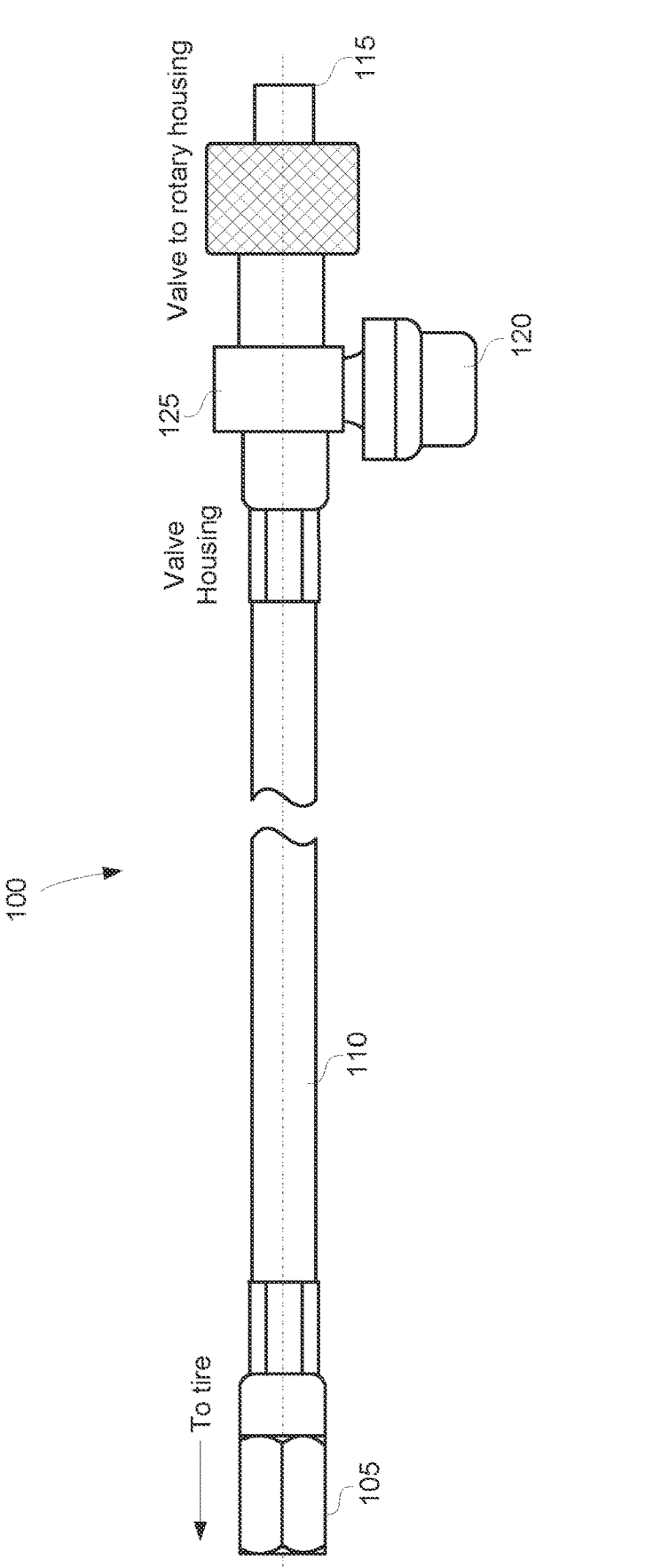
FIG. 1A is side view of a TPMS-integrated automatic tire inflation system hose for an inner tire.

An example TPMS-sensor-integrated automatic tire inflation system hose 100 is shown in FIG. 1A. TPMS-sensor-integrated automatic tire inflation system hose 100 ends at a tire-valve-facing end in a female-threaded valve such as a Shrader valve 105 for mounting to the tire valve. From valve 105, a hose such as a high-pressure resin hose 110 extends to a valve housing 125 adjacent to a female-threaded valve 115 at a rotary-housing-facing end of TPMS-sensor-integrated automatic tire inflation system hose 100. The rotary housing (not illustrated) includes a valve such as a Shrader valve over which female-threaded valve 115 may be threaded.

Figure 1B:
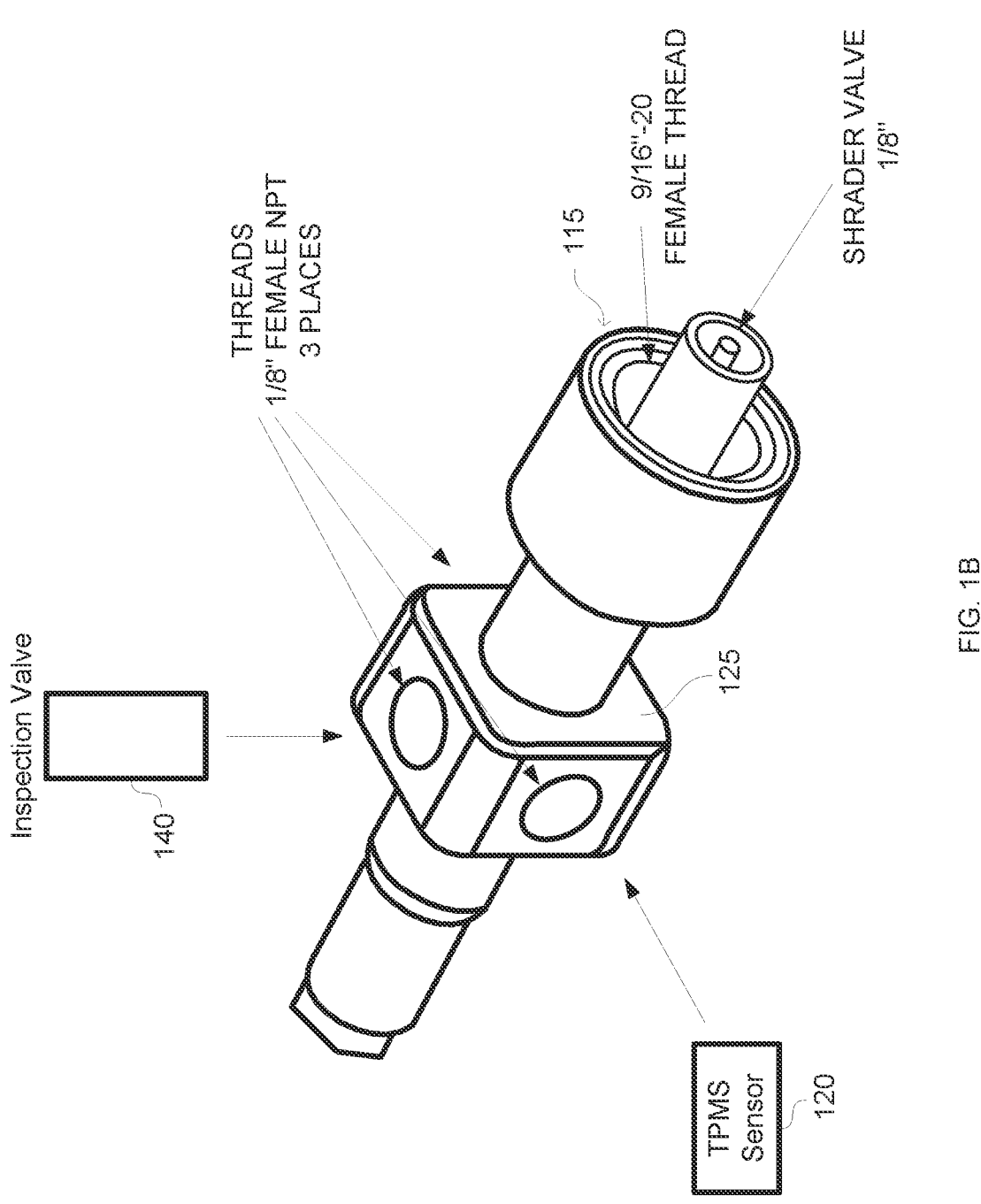
FIG. 1B is an exploded perspective view of the tire-valve-facing end of the TPMS-integrated automatic tire inflation system hose of FIG. 1.

The rotary-housing-facing end of TPMS-sensor-integrated automatic tire inflation system hose 100 is shown in more detail in FIG. 1B. Valve housing 125 includes several female-threaded bores that are in fluid communication with the inner lumen of hose 110 and also female-threaded valve 115. For example, valve housing 125 may have a square-shaped profile such that at least two of the four square faces includes a corresponding bore. One bore receives TPMS sensor 120. To fully integrate TPMS sensor 120 with TPMS-sensor-integrated automatic tire inflation system hose 100, the TPMS sensor threads and/or the TPMS bore's threads may be treated with thread locker or another suitably permanent adhesive. An inspection valve 140 such as a Shrader valve may be threaded into another bore in housing 115.

Figure 2:
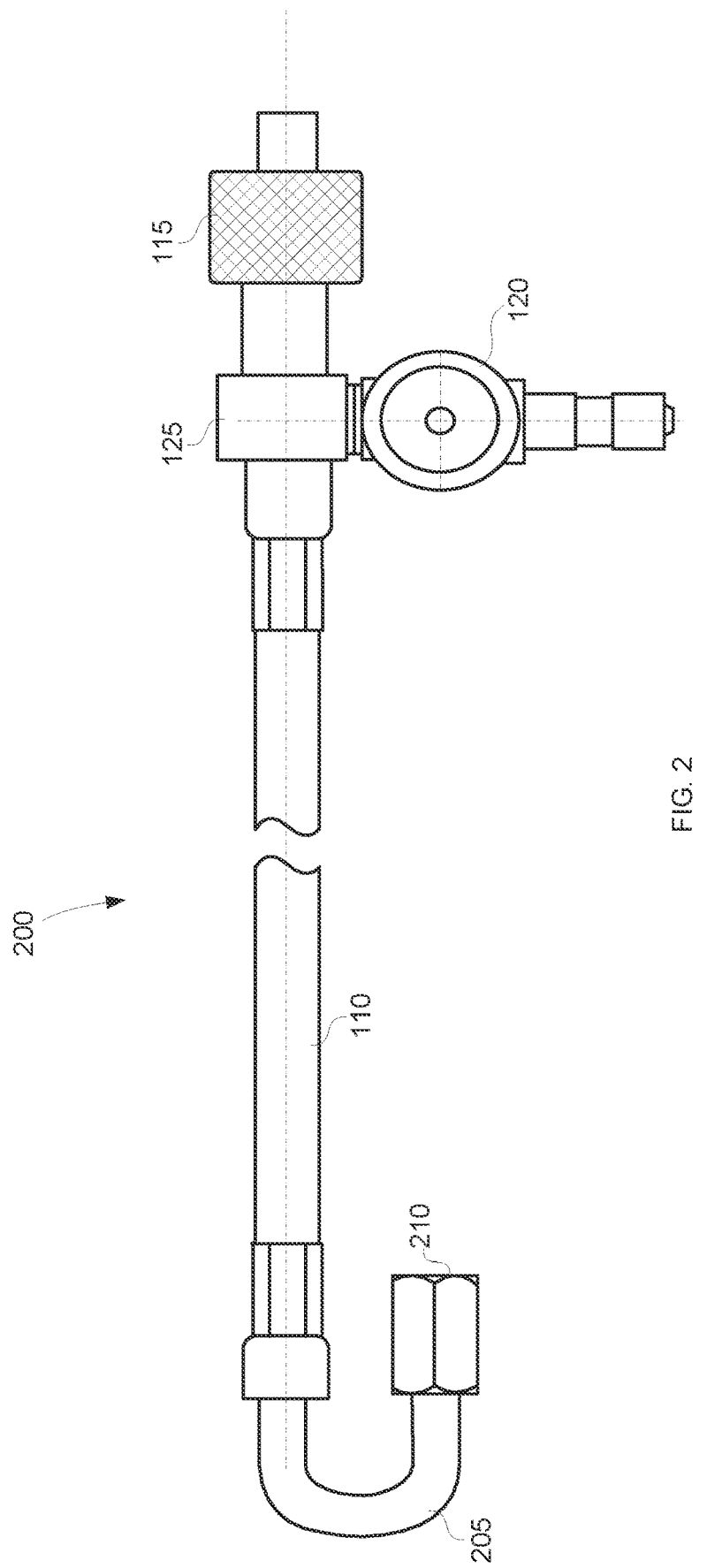
FIG. 2 is a side view of a TPMS-integrated automatic tire inflation system hose for an outer tire.

TPMS-sensor-integrated automatic tire inflation system hose 100 is orientated for an inner tire. In that regard, it is conventional for a towable asset to have each of its axles end in a pair of tires such that one tire in the pair faces the outside of the towable asset whereas the inner tire in the pair faces inwardly next to the outer tire. The orientation of the Shrader valves in the tire pair may thus require a different topology for the inner tire's hose as compared to the outer tire's hose. A TPMS-sensor-integrated automatic tire inflation system hose 200 for an outer tire is shown in FIG. 2. Due to the orientation of the tire valve (e.g., a Shrader valve) in the outer-facing tire, a tire-valve-facing end of TPMS-sensor-integrated automatic tire inflation system hose 200 includes a U-shaped metallic portion 205 ending in a female-threaded valve 210 that may be threaded onto the tire's Shrader valve.

Valve housing 125, TPMS sensor 120, and female-threaded valve 115 are arranged as discussed for TPMS-sensor-integrated automatic tire inflation system hose 100.

Figure 3:
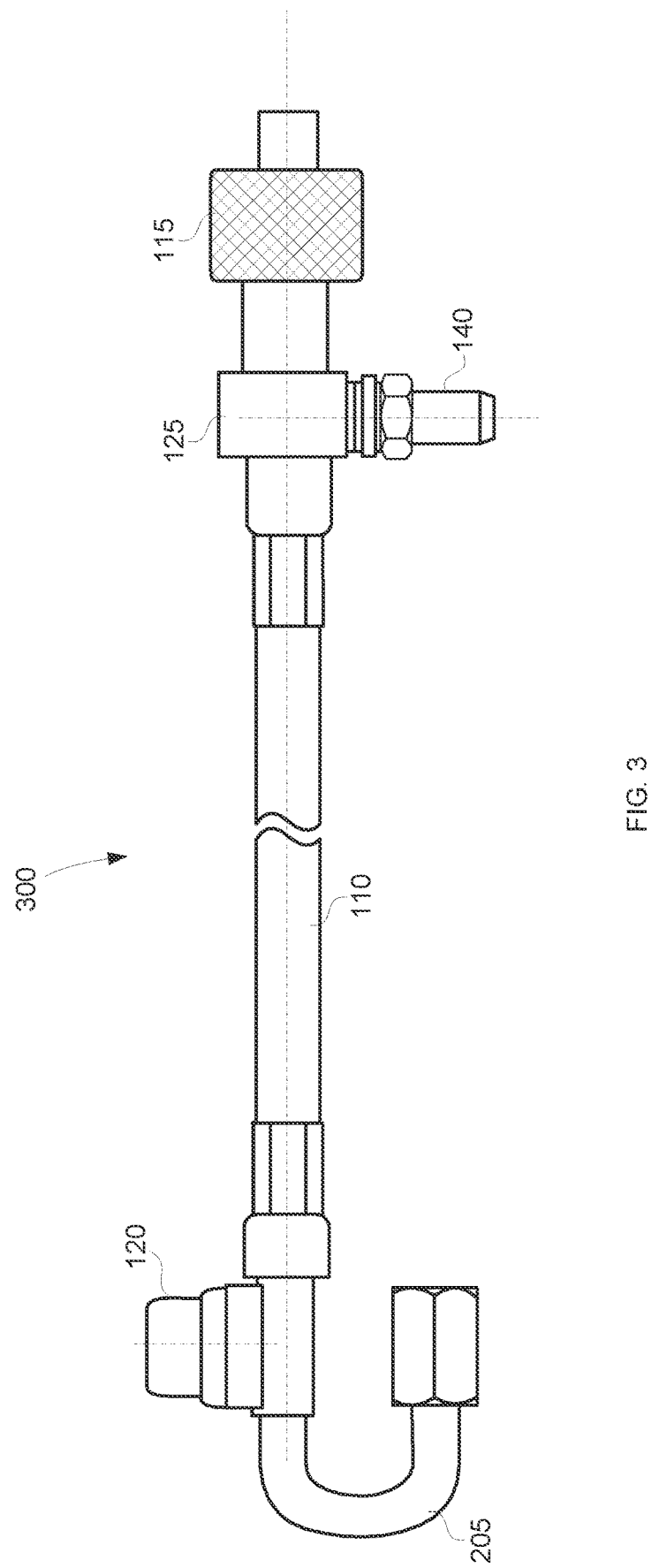
FIG. 3 is a side view of a TPMS-integrated automatic tire inflation system hose for an outer tire.

In an alternative embodiment for the outer tire's hose, TPMS sensor 120 may be welded to U-shaped metallic portion 205 as shown in FIG. 3 for a TPMS-sensor-integrated automatic tire inflation system hose 300. U-shaped metallic portion 205 includes a port to which TPMS sensor 120 is fastened such as through welding so that TPMS sensor 120 may sense the tire pressure. Valve housing 125 thus includes only inspection valve 140 in TPMS-sensor-integrated automatic tire inflation system hose 300. The remaining components are as discussed for hoses 100 and 200. Note that the inner tire's inflation hose may also have the TPMS sensor 120 integrated at the distal end of the inner tire's inflation hose analogous to the integration onto U-shaped metallic portion 205.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A TPMS-sensor-integrated automatic tire inflation system hose, comprising:
   a first female-threaded Schrader valve at a first end of the TPMS-sensor-integrated automatic tire inflation system hose;
   a second female-threaded Schrader valve at a second end of the TPMS-sensor-integrated automatic tire inflation system hose;
   a hose coupled between the first end and the second end;
   a Schrader inspection valve stem in fluid communication with a lumen of the hose; and
   a wireless tire pressure monitoring system (TPMS) sensor in fluid communication with the lumen of the hose.

2. The TPMS-sensor-integrated automatic tire inflation system hose of claim 1, further comprising:
   a U-shaped metallic portion connected between the first valve and the hose, wherein the TPMS sensor is welded to the U-shaped metallic portion.

3. The TPMS-sensor-integrated automatic tire inflation system hose of claim 1, further comprising:
   a valve housing having a first bore and a second bore in fluid communication with the lumen of the hose, wherein the TPMS sensor is threaded into the first bore and the Schrader inspection valve stem is threaded into the second bore.

4. The TPMS-sensor-integrated automatic tire inflation system hose of claim 3, wherein the valve housing is adjacent the second valve.

5. The TPMS-sensor-integrated automatic tire inflation system hose of claim 3, wherein the TPMS sensor is threaded into the first bore with thread locker.

6. The TPMS-sensor-integrated automatic tire inflation system hose of claim 1, wherein the hose comprises a resin hose.

* * * * *